United States Patent [19]

Dodge, Jr.

[11] Patent Number: 4,521,000
[45] Date of Patent: Jun. 4, 1985

[54] BYPASSING DOUBLE ACTION ROPE GRIP

[76] Inventor: Cleveland E. Dodge, Jr., R.D. 1-7, Pownal, Vt. 05261

[21] Appl. No.: 606,351

[22] Filed: May 2, 1984

Related U.S. Application Data

[63] Continuation-in-part of Ser. No. 501,623, Jun. 6, 1983.

[51] Int. Cl.³ .......................... E06C 7/18; A47L 3/04
[52] U.S. Cl. .................................. 254/391; 254/407; 182/5; 188/65.2
[58] Field of Search ............... 254/391, 405, 407, 409, 254/411, 412, 415; 188/65.1, 65.2; 182/5, 8, 71, 72, 191

[56] References Cited

U.S. PATENT DOCUMENTS

| | | | |
|---|---|---|---|
| Re. 30,072 | 8/1979 | Kleine et al. | 188/65.2 X |
| 904,119 | 11/1908 | Downs | 104/182 |
| 4,077,094 | 3/1978 | Swager | 182/5 X |
| 4,193,475 | 3/1980 | Sweet et al. | 182/8 |
| 4,265,179 | 5/1981 | Tupper et al. | 104/115 X |

FOREIGN PATENT DOCUMENTS 1077068 7/1967 United Kingdom .

Primary Examiner—Stuart S. Levy
Assistant Examiner—Joseph J. Hail, III
Attorney, Agent, or Firm—Handal & Morofsky

[57] ABSTRACT

A safety system (10) for protecting workers at high altitudes from falling to the ground is disclosed. The system features a rope grip (12) having a rotably mounted wedge (18) in spaced facing relationship with a retaining member (20). The safety line (14) is jammed between the retaining member and the wedge. The rope grip is able to pass by an anchor (16) by virtue of the fact that the retaining member is held in place by rotating slotted wheels (44 and 46).

10 Claims, 7 Drawing Figures

BYPASSING DOUBLE ACTION ROPE GRIP

CROSS REFERENCE

This application is a continuation in part of U.S. application Ser. No. 501,623 filed on June 6, 1983, of Cleveland E. Dodge, Jr. for a REMOVABLE DOUBLE ACTION ROPE GRIP, the disclosure of which is incorporated herein by reference.

TECHNICAL FIELD

The invention relates to a rope grip and safety system for protecting workmen working at high altitudes from falling to the ground.

BACKGROUND ART

In the past, much effort has been devoted to development of fall prevention devices known as rope grips. The desirable qualities of such a device fall into several categories including safety, reliability, versatility and convenience of use. Dodge Machine Company, Inc. commonly offers a rope grip with a number of desirable qualities, for example the rope grip is manufactured from large pieces of material which distributes the impact of a fall to relatively massive pieces of metal providing strength, reliability and safety.

Another commercially available rope grip is the Barrow-Hepburn-Everest Rope Grip, patented in the U.K. with Pat. No. 1,077,068. This rope grip operates by means of three small steel balls through which a rope is passed. When the rope grip begins to fall rapidly down a rope, the friction of the rope against the balls draws them into a conical shaped housing which jams the rope between the three balls. While this device offers advantages over many others in fail safe operation, it too has practical drawbacks. For example, this device can only be used with a very narrow tolerance in rope diameter. Moreover, the rope must be threaded through the grip, as it can not be opened for placing the grip on the rope.

In U.S. application Ser. No. 501,623 filed on June 6, 1983, a removable double action rope grip is disclosed. This rope grip takes care of many of the practical disadvantages of the prior art, however many problems still remain. In particular, it is often desirable to anchor vertical safety lines on the surface of a nearby structure. According to existing specifications issued by OSHA and other such safety organizations, a safety line should be held in place at least every thirty feet so that it does not blow and flap around in the wind. Whatever means are used to anchor the safety line will, of course, present an obstacle to a rope grip. Conventional safety devices for use on inclined lines cannot pass such an anchor, and therefor the rope grip must be removed from the line and reattached at the desired position.

The Latchway ® Cliprider System manufactured and marketed by Barrow-Hepburn Equipment, Ltd. of London, England discloses a safety system that allows workers to move past clips holding horizontal line in place. In addition, this system has special fittings which allow a safety device to be put on or removed from a cable anywhere in the system.

U.S. Pat. No. 4,265,179 to Tupper describes in detail various aspects of the Cliprider system. By way of summary, the Latchway System is merely a means for protecting a worker by use of a horizontal safety line, and does not provide for arresting movement along the line. That is to say, the worker is protected by a horizontal line while he is working on more or less the same level. This, of course, would not be suitable for use by workers who are climbing long ladders such as found on water storage tanks, television transmitting towers, smokestacks or the like, where a vertical safety line is needed. While the Latchway System does provide a way of bypassing anchors which secure a line, it simply does not act as a safety device for use on an inclined line.

DISCLOSURE OF INVENTION

The present invention relates to a safety sytem for protecting workmen working at high altitudes from falling to the ground and more particularly relates to such systems which use a vertical safety line anchored in place along its length.

It is accordingly an object of the present invention to provide a rope grip which can bypass the anchors holding the line in place without being removed from the safety line.

It is another object of the invention to provide a safe, reliable means for arresting movement along a line.

It is a further object of the invention to provide a rope grip which is simple to manufacture and easy to use.

In accordance with the present invention it has been found that in a safety system including an inclined cable secured at a plurality of points by a plurality of hangers that a rope grip having a guide plate supported by two rotably secured, slotted wheel-like members will obtain the above mentioned objects. The guide plate is maintained in a facing relationship with a rotably mounted wedge, thereby defining a passage for receiving a rope. The wedge is positioned, configured and dimensioned to jam the cable against the plate upon rotation.

BRIEF DESCRIPTION OF DRAWINGS

One way of carrying out the invention is described in detail below with reference to the drawings which illustrate only one specific embodiment of the invention in which.

BEST MODE FOR CARRYING OUT THE INVENTION

Figure 1:
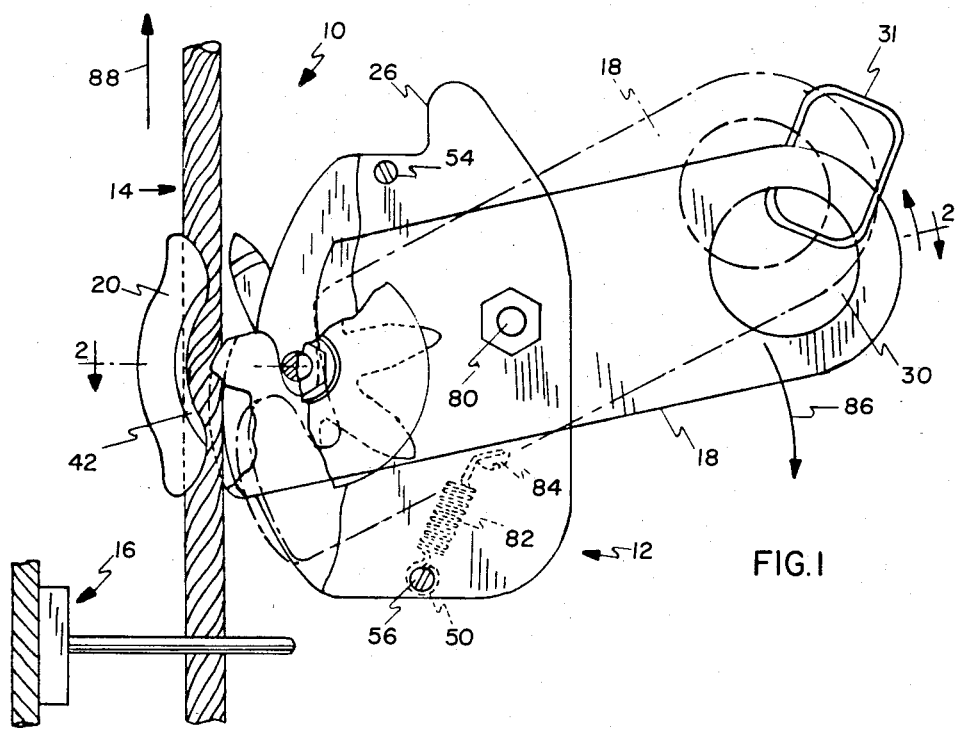
FIG. 1 is a side plan view, in partial cutaway, of the inventive safety system.
Figure 2:
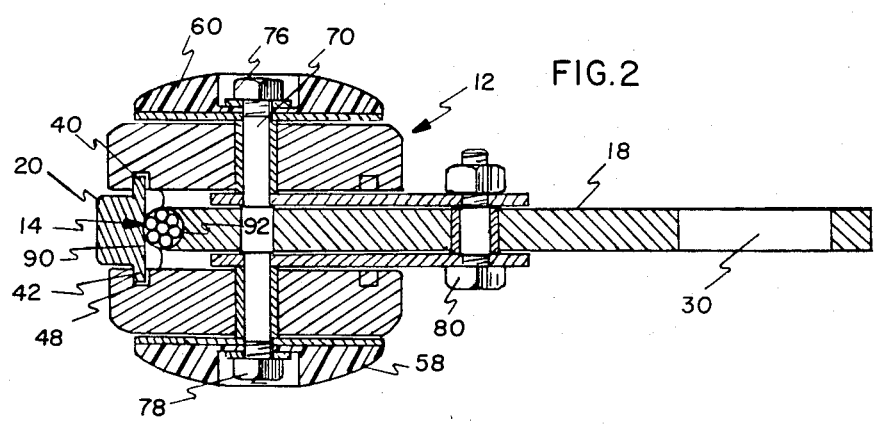
FIG. 2 is a top plan cross-sectional view of the inventive rope grip shown in FIG. 1.

Referring to FIG. 1, the inventive system 10 is shown. The system comprises generally a rope grip 12, a vertical line 14 and an anchor 16 for securing the line. FIG. 2 more clearly shows rope grip 12 disposed about line 14. A channel for receiving the line is defined by a wedge 18 and a retaining member 20.

Figure 3:
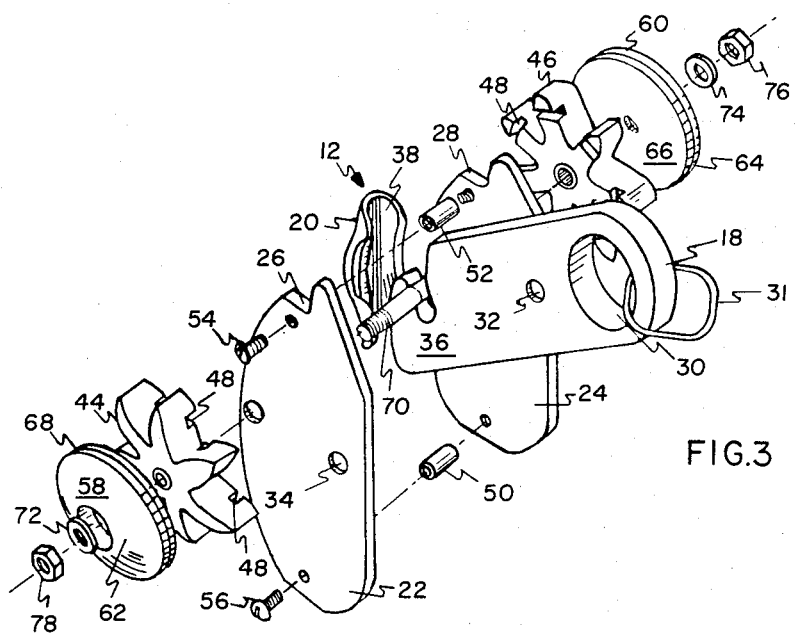
FIG. 3 is an exploded perspective view, reduced in size, of the inventive rope grip shown in FIG. 2.

The details of the construction of inventive rope grip 12 are illustrated in FIG. 3. The inventive rope grip has side plates 22 and 24. The side plates are made of steel having a thickness of approximately 3/32 of an inch and have thumb notches 26 and 28 respectively. Wedge 18 is also made of steel and has a thickness of approximately ⅜ of an inch. The wedge has a large hole 30 which may be used to attach rope grip 12 to a user by means of a ring 31 attached to a harness or any other suitable means. The wedge also has a small hole 32 which is aligned with holes in the side plates such as hole 34 for purposes of mounting the wedge. The wedge is provided with a slotted end 36 configured to cooperate with the other internal parts. Retaining member 20 also has a pair of lips, 40 and 42 resectively as seen most clearly in FIG. 2.

Inventive rope grip 12 has a pair of slotted wheels 44 and 46 whose spokes have a plurality of slots 48 which are adapted to hold retaining member 20 in a facing relationship with wedge 18. This is accomplished by having lips 40 and 42 correspond with the rotation radius of slots 48.

The remaining parts shown in FIG. 3 are largely for the purpose of assembling the rope grip. Wedge 18 is disposed between side plates 22 and 24 along with threaded spacers 50 and 52. The side plates are held together by screws, such as screws 54 and 56 which are threaded into spacers 50 and 52, respectively.

Wedge 18 is held in place by a bolt (not shown) which passes through holes 34, 32 and a corresponding hole in side plate 24.

Two washers, 58 and 60 are positioned outwardly with respect to wheels 44 and 46. The washers have rubber portions 62 and 64 which eliminate unwanted rigid protrusions and inner steel portions 66 and 68 for their mechanical properties so that the wheels will be securely held in place.

A main shaft 70 is placed through the hole in washers 58 and 60 and through the central holes in slotted wheels 44 and 46, the arrangement being illustrated in FIG. 3. The shaft has threaded ends which are secured by washers 72 and 74 as well as nuts 76 and 78. The nuts cannot be overly tight inasmuch as wheels 44 and 46 must be free to rotate as will become apparent in the discussion which follows. Of course, in lieu of shaft 70, a bolt or rivet or appropriate length would be equally suitable. The main shaft is of such radius so as to fit within slotted end 36 of wedge 18.

Before main shaft 70 is secured in place, lips 40 and 42 of retaining member 20 must be properly positioned with respect to slots 48 of wheels 44 and 46. Lips 40 and 42 are held by slots 48 of the spokes of which four are shown in FIG. 2. A bolt 80, not shown in FIG. 3, is illustrated in FIG. 2.

A spring 82 is attached to wedge 18 by means of retaining screw 84. The spring in turn, is connected to threaded spacer 50.

FIG. 1 illustrates the clamping action of the rope grip. Rope grip 12 has been designed with spring 82 exerting downward pressure on wedge 18 urging rotation in the direction of arrow 86. Spring 50 does not exert enough pressure to overcome the weight of the rope grip and therefor when a pressure is applied on the arm, as would be the case when the grip is hanging from the belt of a user, the rope grip 12 may be raised or lowered along line 14 without having wedge 18 jam the line against retaining member 20. Thus, a user's hands remain free while ascending or descending along the rope provided that rope grip 12 is properly attached.

However, if a person falls and therefor releases upward pressure on the wedge arm, spring 82 will pull the arm downward so as to cause rotation in the direction indicated by arrow 86. As the wedge touches line 14 which is moving upward through rope grip 12 in the direction indicated by arrow 88, the line will pull the wedge into jamming position. It should be noted that both retaining member 20 and the surface of wedge 18 facing member 20 have concave surfaces 90 and 92 for accomodating line 14.

Both surface 90 of member 20 and surface 92 of wedge 18 are substantially perpendicular to the axis of rotation of wedge 18, as defined by bolt 80. Member 20 remains substantially stationary with respect to bolt 80, however the wedge, and particularly surface 92 thereof, rotates. The distances from various parts of surface 92 to bolt 80 vary in much the same way as the distances from a side of a rectangle to a point thereon. Thus, as wedge 18 rotates about the bolt the passage defined by surfaces 90 and 92 is restricted and the grip arrests movement along the line.

When upward tension is removed from wedge 18, the grip has more weight towards the extremity of the arm, in the vicinity of hole 30, than at the end of the grip through which the rope passes. Therefor when there is no upward force on the rope grip, the entire unit tips downward, in essence causing rotation of wedge 18 in the direction indicated by arrow 86. This brings the wedge end of the arm against the rope which, in turn, pulls the wedge up into jamming position as the grip travels along the line.

Figures 4, 5, 7:
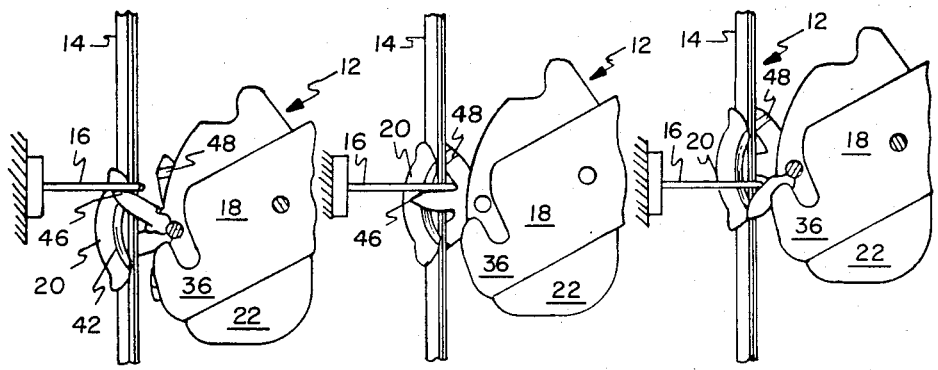
FIG. 4 is a diagrammatic side plan view of the inventive safety system wherein the rope grip is approaching an anchor from below.
FIG. 5 is a diagrammatic side plan view of the inventive safety system wherein the rope grip is moving past an anchor.
FIG. 7 is a diagramatic side plan view of the inventive safety system wherein the rope grip has nearly completed bypassing an anchor.
Figure 6:
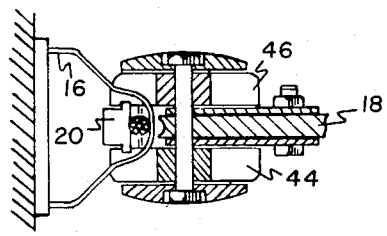
FIG. 6 is a diagrammatic top plan view of the inventive safety system shown in FIG. 4.

The operation whereby rope grip 12 by passes an anchor 16 is illustrated in FIGS. 4 through 7. FIG. 4 shows the grip approaching an anchor from below. A top view of the same is shown in FIG. 6. Anchor 16 is configured to fit between side plates 22 and 24, member 20 and wedge 18. As rope grip 12 advances along the line, wheels 44 and 46 rotate so as to allow the grip to bypass anchor 16. During the process illustrated in FIGS. 4 through 7 the retaining member remains held in place by slots 48 of the spokes of the rotating wheels. The dimensions of lips 40 and 42 of retaining member 20 and the distance between slots is such that the two slots are always securing each lip.

Notches 26 and 28 are most useful for a variety of purposes. When the inventive rope grip comes into contact with anchors 16 it tends to tilt forward so as to prevent the anchor from passing through sprocket wheels 44 and 46. Preferably, rope grip 12 should be more or less perpendicular to anchor 16. An operator merely touches thumb grips 26 and 28 and pulls back on it very slightly in order to allow the anchor to pass through the sprocket system, as discussed above.

Moreover, if a user feels he is falling and puts his hand on line 14 directly above the grip, his hand will slide down the line until it contacts the device at which point the hand touches the protrusion of the thumb notches which drives the upper part of the grip away from the rope. The wedge will then come into contact with the line and be urged into jamming position. Finally, it should be noted that the notches make it easy to rotate the wedge using only one hand.

INDUSTRIAL APPLICABILITY

The inventive safety system illustrated herein above was designed and constructed using many currently available parts. In this way the need for specialized equipment and manufacturing steps were kept to a minimum thus reducing capital equipment costs. In particular, the wheels such as wheels 44 and 46 and accompanying hardware were obtained from the Latchway ® system of the Barrow-Hepburn Company of London, England.

Due to the very small space in which the wedge can operate and still be compatible with currently available parts it has been designed with a slotted end 36 which allows rotation. When the grip jams against the rope it simultaneously comes in contact with the pivot shaft, that is main shaft 70 illustrated above, so that the forces of stopping the fall are distributed between the retaining member and the main shaft of the grip. The wedge merely transfers the forces from the rope through the wedge and to the pivot shaft since all parts are in contact with one another. Without shaft 70, it is unlikely that slotted end 36 of wedge 18 would be able to withstand the impact.

As a result of using the currently available parts and the space limitations resulting therefrom, it is not possible to include a jamming roller on the actuating arm in the embodiment illustrated above as was the case in application Ser. No. 501,623 of Dodge. Therefor the wedge configuration illustrated was developed to provide a degree of failsafe operation by having the wire rope touch the wedge and pull it into place creating a jamming action for stopping the fall.

While an illustrative embodiment has been described, it is of course understood that various modifications will be obvious to those of ordinary skill in the art. These modifications are within the spirit and scope of the instant invention which is limited and defined only by appended claims.

I claim:

1. A rope grip comprising:
    (a) guide means for defining a first gripping surface;
    (b) operator means for defining a second gripping surface, said first and said second gripping surfaces defining a passage for receiving a cable therebetween;
    (c) support means for rotatably supporting said operator means so that said second gripping surface is in a facing spaced relationship with said first gripping surface, said operator means being configured so that said second gripping surface will define a plurality of radii about its axis of rotation thereby changing the dimensions of said passage upon rotation of said operator means;
    (d) a pair of rotatably secured support members with a plurality of spokes having coupling means for supporting said first gripping surface so that said rope grip will jam a cable between said first gripping surface and said second gripping surface upon rotation of said operator means, said support members allowing said rope grip to pass obstacles of specific dimensions along the cable; and
    (e) securing means for securing said rope grip to a user.

2. The rope grip according to claim 1, comprising further spring means for urging said operator means to a position for jamming said cable upon removal of tension from said operator means.

3. The rope grip according to claim 2, wherein said first gripping surface and said second gripping surface are concave thereby defining a cylindrical passage for receiving said cable therebetween.

4. The rope grip according to claim 1, wherein said operator means comprises a cam defining a trough, said support members being rotatably supported by a central shaft, said trough being positioned, configured and dimensioned to allow the upward rotation of said cam until contact between said shaft and said cam occurs.

5. The rope grip according to claim 4, comprising further spring means for urging said operator means to a position for jamming said cable upon removal of tension from said operator means.

6. The rope grip according to claim 5 wherein said first gripping surface and said second gripping surface are concave, thereby defining a cylindrical passage for receiving a cable therebetween.

7. The rope grip according to claim 6, wherein said support means comprises a housing with a protrusion adapted for use as a thumb grip.

8. The rope grip according to claim 7, wherein said spring means comprises a spring attached to said cam, the weight of said rope grip being sufficient to provide rotational force to overcome the force exerted by said spring on said cam when said rope grip is suspended from said securing means.

9. The rope grip according to claim 8, configured and dimensioned so that the center of gravity of said rope grip occurs further from said cable than does the axis of rotation of said cam whereby said second gripping surface moves toward a jamming position upon removal of support for said rope grip.

10. An improved safety system for protecting workmen at high altitudes from falling to the ground of the class wherein a cable is secured to a wall at a plurality of points by a plurality of hangers and a safety device is disposed about said cable, said safety device having a gripping member secured by two rotating slotted wheel-like members so that said safety device may pass said hangers without being removed from said cable, wherein the improvements comprise an inclined line and a rope grip for arresting motion on said inclined line, said rope grip comprising:
    (a) guide means for defining a first gripping surface;
    (b) operator means for defining a second gripping surface, said first and second gripping surfaces defining a passage for receiving a cable therebetween;
    (c) support means for rotatably supporting said operator means so that said second gripping surface is in a facing spaced relationship with said guide means, said operator means being configured so that second gripping surface defines a plurality of radii about its axis of rotation; and
    (d) two rotatably secured support members with a plurality of spokes having grooves for supporting said first gripping surface by engaging a ridge on said guide means so that said rope grip will jam a cable between said first gripping surface and said second gripping surface upon rotation of said operator means, said support members allowing said hangers to pass between said first gripping surface and said second gripping surface.

* * * * *

Disclaimer 4,521,000.—*Cleveland E. Dodge, Jr.*, Pownal, Vt. BYPASSING DOUBLE ACTION ROPE GRIP. Patent dated Jun. 4, 1985. Disclaimer filed May 4, 1990, by the assignee, Latchways Limited.

Hereby enters this disclaimer to all claims of said patent.
[ *Official Gazette August 7, 1990* ]